Patented May 7, 1929.

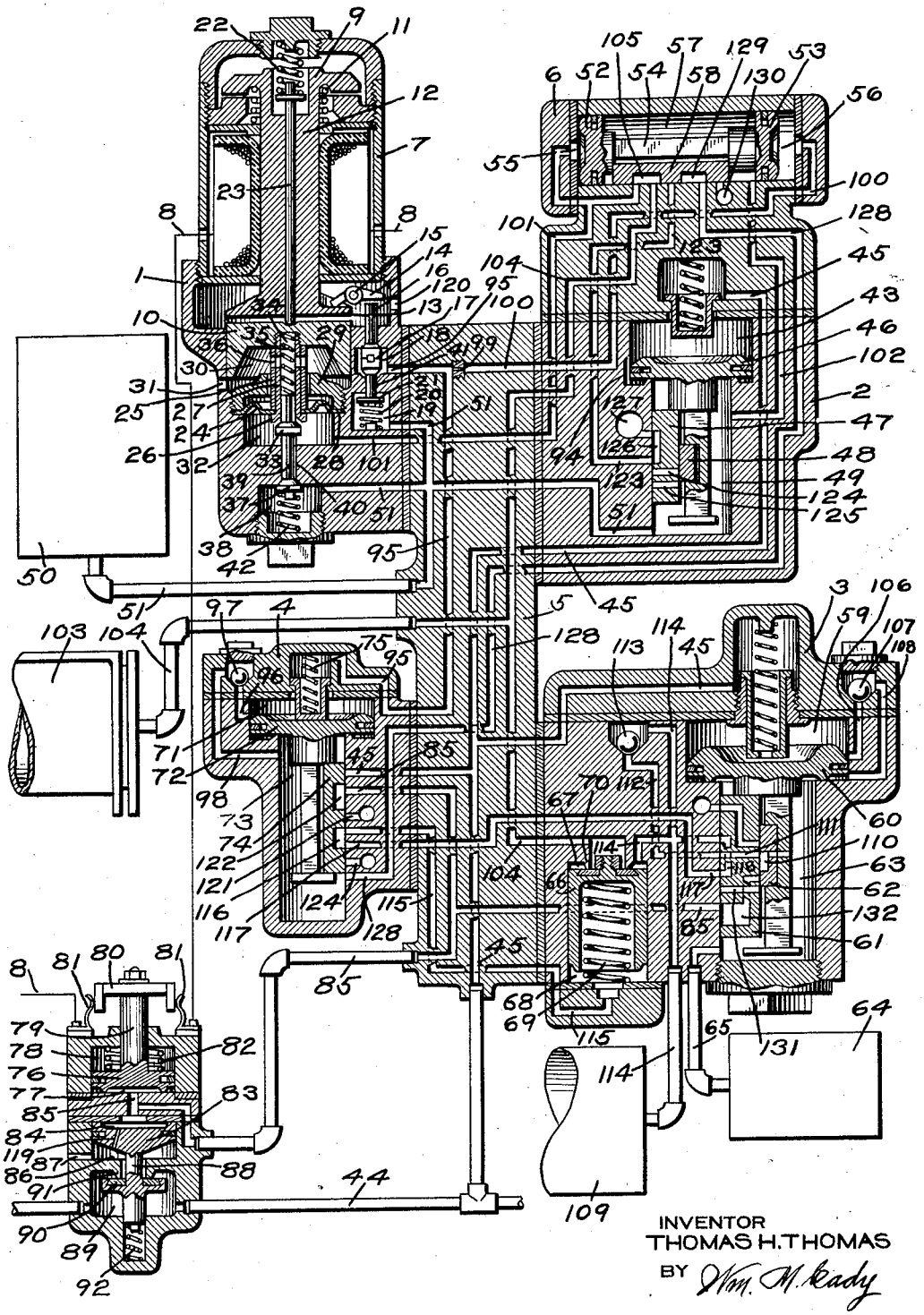

1,711,760

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed February 14, 1928. Serial No. 254,204.

This invention relates to electro-pneumatic brakes and more particularly to the type in which the brakes are controlled either electrically or pneumatically.

One object of this invention is to provide an improved brake apparatus of the above type, having positive and automatic means for changing the brake control from electric to pneumatic or from pneumatic to electric.

Another object of this invention is to provide improved means for quickly obtaining a high brake cylinder pressure, when an emergency application of the brakes is effected electrically, but for delaying the obtaining of a high brake cylinder pressure, when an emergency application of the brakes is effected pneumatically.

Other objects and advantages will appear in the following more detailed description of my invention.

In the accompanying drawing, the single figure is a diagrammatic view, partly in section, of an electro-pneumatic brake apparatus embodying my invention.

As shown in the drawing, the brake apparatus comprises a control valve device, a combined emergency switch and vent valve device, an auxiliary reservoir, an emergency reservoir, a quick action reservoir and a brake cylinder.

The control valve device comprises a magnet portion 1, a triple valve portion 2, an emergency valve portion 3, and an emergency by-pass valve portion 4, said portions being mounted on a common bracket 5. Associated with the triple valve portion is a change-over valve portion 6.

The magnet valve portion 1 comprises a magnet 7 which is subject to variations in current flow through a train wire 8, and is adapted to control two independently movable armatures 9 and 10.

The armature 9 is acted upon by a spring 11 adapted to oppose the magnetic force of the magnet 7 when energized, and has a stem 12 extending downwardly through a central opening in the magnet. Mounted on the lower end of said stem is a flange 13, adapted to engage one arm of a lever 14 and rotate said lever about a fixed pin 15. The other arm of said lever is adapted to engage the fluted stem 16 of a double beat valve 17, which is contained in a valve chamber 18. Said valve also has a fluted stem 41 at the opposite side, said stem extending through a partition wall in the casing and into a chamber 19, wherein a spring 20, acting upon a washer 21, mounted on said stem, urges the valve 17 upwardly.

The magnetic force of the magnet 7 upon the armature 10 is opposed by the pressure of a spring 22 acting upon a push rod 23, which extends through a central bore in the armature stem 12 and engages the armature 10. Associated with said armature is a flexible diaphragm 24 clamped between one end of an external sleeve 25 and a collar 26 formed at the outer end of an internal sleeve 27, which has screw-threaded engagement in the armature 10. The rim of the diaphragm is clamped between a shoulder 28 in the casing and a nut 29 having screw-threaded engagement in the side wall of the casing, the sleeves 25 and 27 being adapted to operate through a central opening formed in said nut. The diaphragm 24 has at one side a chamber 30, which is connected to the atmosphere through a passage 31 and has at the opposite side a chamber 32.

The fluted stem of a valve 33 is disposed in a central bore 34 in the sleeve 27 and the valve is adapted to seat on a valve seat provided in the sleeve collar 26, said valve being urged from its seat by a spring 35 and being adapted to control communication between chambers 30 and 32 by way of bore 34 in the sleeve 27 and ports 36 in the side wall of the sleeves 25 and 27.

A valve 37, in axial alignment with the valve 33, is contained in a chamber 38 and has a fluted stem 39 extending through a partition wall 40 and adapted to engage and be operated by the valve 33, the unseating of said valve 37 being opposed by the pressure of a spring 42.

The triple valve portion comprises a casing having a chamber 43 connected to the brake pipe 44 through a passage 45 and containing a piston 46, which is adapted to operate a main slide valve 47 and an auxiliary slide valve 48 contained in a valve chamber 49. The valve chamber 49 is connected to an auxiliary reservoir 50 through passage and pipe 51, said passage also being connected to valve chamber 38 and spring chamber 19 of the magnet portion 1.

Associated with the triple valve portion is the change-over valve portion 6, which comprises a casing having a cylindrical bore containing two pistons 52 and 53, operatively connected together by a stem 54. The piston 52 has a chamber 55 adjacent its outer face, the piston 53 has a chamber 56 adjacent its outer face, while intermediate said pistons is a chamber 57 containing a slide valve 58 adapted to be operated by said pistons.

The emergency valve portion 3 comprises a casing having a chamber 59, connected to the brake pipe 44 through passage 45 and containing a piston 60 adapted to operate a main slide valve 61 and an auxiliary slide valve 62 contained in a valve chamber 63, said valve chamber being connected to the quick action reservoir 64 through a passage and pipe 65. A valve piston 66 is disposed in a cylindrical bore in the casing and has at one side a chamber 67 and at the opposite side a chamber 68 containing a spring 69 tending to seat the valve piston against a seat ring 70 in chamber 67.

The emergency by-pass valve portion 4 comprises a casing having a chamber 71 containing a piston 72, and a valve chamber 73 containing a slide valve 74 adapted to be operated by said piston, outward movement of the piston being opposed by the pressure of a spring 75.

The emergency switch device and vent valve device are preferably associated together, the switch device comprising a piston 76 having at one side a chamber 77 and at the opposite side a chamber 78. Said piston has a stem 79 extending upwardly through the top wall of the chamber 78. Mounted on the outer end of the stem 79 is a switch member 80, which is adapted to normally connect two flexible contact fingers 81 in the circuit of the train wire 8, a spring 82, contained in chamber 78, being employed to urge the switch piston 76 downwardly, thereby tending to maintain the circuit closed in train wire 8. The vent valve device comprises a piston 83 having at one side a chamber 84 connected to the switch piston chamber 77 through passage 85 and having at the opposite side a chamber 86 connected to the atmosphere through a passage 87. Said piston has a stem 88 extending downwardly through an opening in a wall separating chamber 86 from a chamber 89. Mounted on said stem is a vent valve 90 adapted to be operated by the piston 83, the vent valve being urged toward a seat ring 91 by a spring 92 acting on an extension of the piston stem 88.

Suitable means (not shown) are provided for varying the current flow through the magnet 7 and when the current flow is of sufficient strength, the magnetic pull of the magnet 7 on the armature 10 will be such that the opposing pressure of spring 22 acting through stem 23 is overcome and the armature 10 with the diaphragm 24 will be moved upwardly to a position in which the valve 37 is seated by the action of spring 42, while the valve 33 is unseated by the upward movement of the valve seat thereof. The magnetic pull of the magnet 7 on the armature 9 also overcomes the opposing pressure of spring 11, so that the armature moves the stem 12 and the flange 13 downwardly, permitting movement of lever 14, so that the double beat valve 17 is seated in its upper position by the spring 20.

Fluid under pressure supplied to the brake pipe 44, flows therefrom through passage 45 to the triple valve piston chamber 43, wherein said pressure acts upon the piston 46, thereby shifting said piston and the slide valves 47 and 48 to release position, as shown in the drawing. The valve chamber 49 is then charged from said piston chamber through feed groove 94 around the piston 46, and the auxiliary reservoir 50 is charged from said valve chamber through passage and pipe 51, as well as the valve chamber 38 and spring chamber 19 of the magnet valve portion. Since the double beat valve 17 is seated in its upper position, the emergency by-pass valve piston chamber 71 is charged with fluid from the auxiliary reservoir by flow from chamber 19 to chamber 18 and from thence through passage 95. The pressure of spring 75 normally maintains the by-pass piston 72 and slide valve 74 in the inner position, so that fluid under pressure is thereby permitted to flow from the piston chamber 71 to the slide valve chamber 73 by way of passage 96, past a ball check valve 97 and from thence through passage 98.

Fluid at auxiliary reservoir pressure also flows from passage 95, through a choke plug 99 and passage 100 to the change-over valve piston chamber 56 and shifts the change-over valve pistons 53 and 52 and slide valve 58 to the electric operating position, as shown in the drawing. This is possible, since the change-over valve piston chamber 55 is vented to the atmosphere, when the magnet 7 is energized, by way of passage 101, past the unseated magnet valve 33, through spring chamber 34 and ports 36 in the sleeves 25 and 27, chamber 30 and from thence through the atmospheric passage 31. The valve chamber 57 intermediate the change-over valve pistons, is charged with fluid under pressure from the triple valve chamber 49 through passage 102.

With the change-over slide valve 58 in electric operating position, and the magnet 7 in release position, brake cylinder 103 is vented to the atmosphere through pipe and passage 104, cavity 105 in the change-over slide valve 58 and the passage 101.

The emergency valve piston chamber 59 is charged with fluid under pressure from the brake pipe 44 through passage 45. The pressure of fluid in said chamber acts on piston 60, shifting same to the release position, in which the valve chamber 63 is charged with fluid under pressure by flow through passage 106, past a ball check valve 107 and through passage 108. The quick action reservoir 64, being connected to valve chamber 63 through pipe and passage 65, is also charged with fluid at brake pipe pressure.

With the emergency piston 60 and slide valves 61 and 62 in the normal position, as shown in the drawing, the emergency reservoir 109 is charged with fluid under pressure from valve chamber 63, by flow through port and cavity 110 in the auxiliary slide valve 62, port 111 in the main slide valve 61, passage 112, past a ball check valve 113 and through passage and pipe 114. Spring chamber 68 at the lower side of the valve piston 66, being connected to the emergency reservoir passage 114, by way of passage 115, cavity 116 in the by-pass slide valve 74, passage 117 and cavity 118 in the emergency slide valve 61, is also charged with fluid under pressure, which acts in conjunction with the spring 69 to maintain the valve piston 66 seated against the seat ring 70, so that communication is cut off between the emergency reservoir passage 114, which is connected to valve piston chamber 67, and the brake cylinder passage 104.

With the brakes released and the apparatus charged with fluid under pressure in the manner above described, the train wire switch 80 closes the connection through train wire 8, and the vent valve 90 is seated against the seat ring 91, due to the pressure of springs 82 and 92 respectively, the piston chambers 77 and 84 being at atmospheric pressure, since the passage 85 leading thereto is lapped by the emergency slide valve 61 and by-pass slide valve 74 and said chambers are connected to the atmosphere through port 119 in the vent valve piston 83, chamber 86 and the atmospheric passage 87.

If it is desired to effect an electric service application of the brakes, the current flow through the magnet 7 is reduced a certain amount, dependent upon the degree of brake cylinder pressure desired. The magnetic pull of the magnet 7 is thus reduced, permitting spring 22 to shift the armature 10 downwardly away from the armature stem 12, but said reduction in magnetic pull is not sufficient to permit spring 11 to shift the armature 9 upwardly, so as to operate the double beat valve 17.

Said downward movement of the armature 10 first causes the valve seat in the collar 26 of the armature sleeve 27 to be brought into engagement with the valves 33, so as to cut off the exhaust connection from the brake cylinder chamber 32, and then further movement causes the valve 37 to be unseated. Fluid under pressure then flows from the auxiliary reservoir 50 to the brake cylinder 103, through pipe and passage 51, valve chamber 38, valve chamber 32, passage 101, cavity 105 in the change-over slide valve 58 and passage and pipe 104.

When the brake cylinder pressure acting upon the diaphragm 24 in chamber 32 is increased a sufficient degree to slightly overbalance the difference between the downward pressure of spring 22 and the reduced upward pull of the magnet 7 on the armature 10, said diaphragm is deflected upwardly a sufficient distance to permit valve 37 to seat, so as to prevent further flow of fluid under pressure to the brake cylinder, but such upward deflection of said diaphragm is insufficient to unseat the exhaust valve 33.

In order to effect an electric emergency application of the brakes, the train wire circuit is opened, thereby causing the magnet 7 to become totally deenergized. The armature 10 is then shifted downwardly by spring 22 and operates valves 33 and 37 in the same manner as when a service application of the brakes is effected. The armature 9 is shifted upwardly, at the same time, by spring 11, thereby causing the flange 13 on the armature stem 12 to rotate the lever 14 and shift the double beat valve 17 to its lower position, so as to disconnect chambers 18 and 19 from each other, and at the same time to vent the chamber 18 to the atmosphere, past the fluted valve stem 16 and through the atmospheric passage 120 in the side wall of the casing. The by-pass valve piston chamber 71 being connected to chamber 18 through passage 95, fluid under pressure is vented therefrom, thereby permitting the pressure of the fluid in valve chamber 73 to shift the by-pass piston 72 and slide valve 74 to their extreme upward position, in which the chamber 68 at the lower side of the valve piston 66 is vented to the atmosphere through passage 115, cavity 116 in the by-pass slide valve 74 and the atmospheric passage 121. The pressure of fluid from the emergency reservoir acting on the upper side of the valve piston 66, outside of the seat ring 70, then shifts said valve piston downwardly against the pressure of spring 69, thereby permitting fluid under pressure to rapidly flow from the emergency reservoir 109 through chamber 67 and passage 104 to the brake cylinder 103.

When the by-pass slide valve 74 is in its upper position, fluid under pressure is supplied from the brake pipe passage 45 to the switch piston chamber 77 and vent valve piston chamber 84, by way of cavity 122 in the by-pass slide valve 74 and passage and pipe 85. The pressure of the fluid in chamber 77 then causes the piston 76 to shift the train wire switch 80 upwardly and the piston 83 operates to unseat the vent valve 90.

With the vent valve 90 unseated, fluid under pressure is vented from the brake pipe 44, the triple valve piston chamber 43 and the emergency valve piston chamber 59 to the atmosphere by way of said unseated valve, the chamber 86 and the atmospheric passage 87. The triple valve piston 46 and slide valves 47 and 48 are then shifted to emergency position by the fluid under pressure in the valve chamber 49. The emergency piston 60 and slide valves 61 and 62 are also shifted upwardly to emergency position by fluid under pressure in the valve chamber 63, and in emergency position the fluid under pressure in said chamber and the connected quick action reservoir 64 is gradually vented to the atmosphere through port 132 in the main slide valve 61, passage and pipe 85, vent valve piston chamber 84, port 119 in the vent valve piston and through the atmospheric passage 87, thereby permitting the switch 80 and vent valve 90 to automatically close after a predetermined period of time.

In electric emergency position of the magnet 7, the change-over valve piston chamber 56 is vented to the atmosphere at a restricted rate through passage 100, choke plug 99, passage 95 and past the double beat valve 17, which is seated in the lower position. Since the piston chamber 55, at the outer face of the opposing change-over valve piston 52, becomes charged with fluid under pressure through passage 101 from the magnet valve chamber 32, the pressure on piston 52 shifts the pistons and slide valve 58 to the right or pneumatic position, in which the brake cylinder 103 is connected to the seat of the triple valve slide valve 47 through passage 104, cavity 105 in the change-over slide valve 58 and passage 123. However, in an electric emergency, such movement of of the change-over valve pistons and slide valve has no effect upon the brake application.

In emergency position the by-pass valve chamber 73 is vented to the atmosphere through passage 124 in the slide valve seat, so that after having caused the valve piston 66, switch piston 76 and vent valve piston 83 to operate as hereinbefore described, the pressure of spring 66 shifts the by-pass piston 72 and slide valve 74 back to their normal position.

It will be noted that in effecting an electric emergency application of the brakes in the manner above described, that the train wire switch 80 is operated to open the train wire circuit and that the brake pipe 44 is vented and causes the triple valve portion 2 and emergency valve portion 3 to operate, but without any effect upon the brake application. Under some conditions however, such as in case the magnet 7 on only one car becomes short circuited and operates to apply the brakes on that car, it is desirable to cause a brake application on the entire train. Deenergizing of the magnet 7, due to short circuiting, causes an emergency application of the brakes on the one car to occur in the same manner as above described, and the consequent operation of the train wire switch 80 opens the circuit in the train wire 8, so as to cause the magnet 7 to become deenergized on every car in the train and thereby effect an emergency brake application.

In case the brake pipe becomes ruptured and causes a rapid drop in the brake pipe pressure, it is desirable to rapidly apply the train brakes, and in order to accomplish this when controlling the brakes electrically, the rapid drop in brake pipe pressure causes the emergency valve piston 60 and slide valves 61 and 62 to move to emergency position, in which fluid under pressure flows from the valve chamber 63 and the quick action reservoir 64 to the switch piston chamber 77 and vent valve piston chamber 84. The emergency switch 80 is thereby operated to open the circuit in train wire 8, so as to cause an emergency application of the brakes to occur on the entire train in the same manner as hereinbefore described.

If, for any reason, the electric switch 80 fails to open the train wire circuit on the car adjacent the point of rupture in the brake pipe, the rapid serial venting of the brake pipe by the operation of the emergency valve portion 3 and the vent valve device, causes said switch to operate on a near-by car and thus cause an eelctric emergency application of the brakes to occur.

It will therefore be noted, that in order to reduce to a minimum the possiblity of failure to obtain brakes on a train in emergency, the pneumatic, as well as the electric portions of this apparatus operates in emergency, so that in case one means of applying the brake fails, the alternate means operates as required.

In order to reclase after an electric emergency application of the brakes, the circuit through the train wire 8 is again closed and the brake pipe is recharged with fluid under pressure. The strength of the current in the train wire 8 is built up sufficiently to cause the armatures 9 and 10 to return to their normal positions. With the double beat valve 17 again seated in its upper position, the change-over valve portion is returned to its normal position, in which the brake cylinder is vented to the atmosphere, by way of the unseated magnet valve 33, in the manner hereinbefore described. Recharging the brake pipe causes the pneumatic portions to return to their normal positions, the same as in initial charging, in which positions the various chambers, the auxiliary reservoir 50, emergency reservoir 109 and quick action reservoir 64 are also recharged.

When the electric control is not in use and the electric circuit of the magnets 7 throughout the train remains open or the supply of current is temporarily cut off, the magnet 7 on every car in the train is deenergized and the change-over slide valve 58 is therefore maintained in the pneumatic position, to the right, since the piston chamber 55 is charged with fluid under pressure from the auxiliary reservoir 50 by way of the unseated magnet valve 37, and the piston chamber 56 is vented to the atmosphere by way of the double beat valve 17 in the magnet portion, which valve is seated in the lower position. In this pneumatic position, the brake cylinder 103 is connected to the seat of the triple valve slide valve 47 through passage 104, cavity 105 in the change-over slide valve 58 and passage 123.

If, with the magnets thus deenergized, it is desired to pneumatically operate the brakes, the brake pipe pressure may be gradually reduced in the well known manner, so as to cause the triple valve to move to service position, in which fluid under pressure is permitted to flow from the auxiliary reservoir 50 to the brake cylinder 103 through passage 51, valve chamber 49, service port 124 in the slide valve 47 and passage 123. In order to effect an emergency application of the brakes, the brake pipe pressure is suddenly reduced, thereby causing the triple valve to move to emergency position, in which the emergency port 125 in the slide valve 47 registers with the passage 123, so as to permit a faster rate of flow of fluid under pressure from the auxiliary reservoir to the brake cylinder. When the brake pipe pressure is restored, the triple valve is shifted back to release position, in which the brake cylinder is vented to the atmosphere through passage 123, cavity 126, in the slide valve 47 and the atmospheric passage 127.

When the brake pipe pressure is reduced to apply the brakes in service, as above described, the emergency piston 60 is shifted upwardly and causes the auxiliary slide valve 62 to uncover the port 132 in the main slide valve 61. Fluid under pressure then flows from the valve chamber 63 and quick action reservoir 64 to the atmosphere at a restricted rate, through said port 132, passage 85, port 119 in the vent valve piston 83 and passage 87, so as to reduce the pressure acting on the opposite sides of the emergency piston 60 at substantially the same rate and thereby prevent said piston from moving further upwardly to emergency position.

When the brake pipe pressure is suddenly reduced and the triple valve is thereby moved to emergency position, the emergency valve piston 60 is also shifted to emergency position in order to propagate quick emergency action and to control the building up of a high brake cylinder pressure, in the following manner. In emergency position of the emergency slide valves 61 and 62, fluid under pressure flows from the valve chamber 63 and quick action reservoir 64 to the vent valve piston chamber 84, through port 132 in the emergency slide valve 61 and passage and pipe 85. The vent valve piston 83 is thereby operated and unseats the vent valve 90 and thus locally connects the brake pipe 44 to the atmosphere through the atmospheric port 87 in the side wall of the casing. Since the vent valve piston chamber 84 is connected to the atmosphere through the restricted port 119 in the piston 83 and the atmospheric passage 87 in the casing, the pressure of the fluid in the emergency valve chamber 63 reduces at a predetermined rate.

With the magnet 7 deenergized and the change-over slide valve 58 in pneumatic position, the by-pass valve piston chamber 71 is connected to the atmosphere past the double beat magnet valve 17, and the by-pass slide valve chamber 73 is connected to the atmosphere through passage 128, cavity 129 in slide valve 58 and the atmospheric passage 130, so that the by-pass piston 72 and slide valve 74 are maintained in the position shown in the drawing, by the spring 75. In this position of the by-pass slide valve 74 and with the emergency slide valves 61 and 62 in emergency position, the chamber 68 at the lower side of the valve piston 66 is connected to the emergency valve chamber 63 through passage 115, cavity 116 in the by-pass slide valve 74, passage 117 and port 131 in the emergency slide valve 61, so that in emergency, the pressure of the fluid in valve piston chamber 68 reduces with the pressure in the emergency valve chamber 63. When said pressure is thus reduced a predetermined degree, the opposing emergency reservoir pressure in chamber 67, outside of the seat ring 70, shifts the valve piston 66 to its downward position, in which fluid under pressure is permitted to flow from the emergency reservoir 109 to the brake cylinder 103, by way of pipe and passage 114, chamber 67 and passage and pipe 104, thus building up a high brake cylinder pressure.

It will therefore be noted that in pneumatic emergency operation, the high brake cylinder pressure is not obtained immediately as in electric emergency operation, but is delayed a predetermined time, governed by the rate of reduction in the pressure of the fluid in the emergency valve chamber 63 and valve piston chamber 68.

It will further be noted, that the positioning of the change-over slide valve 58 is positive for both electric and pneumatic operation, since the position of said valve depends entirely upon whether or not the magnet 7 is energized. If said magnet is energized the change-over valve piston chamber 55 is vented and the piston chamber 56 is charged with fluid under pressure from the auxiliary reservoir 50, so that the slide valve 58 is maintained in the electric operating position, to the left. If said magnet is deenergized, the piston chamber 55 is charged with fluid at auxiliary reservoir pressure, while the chamber 56 is vented, so that the slide valve 58 is maintained in the pneumatic operating position, to the right.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an electro-pneumatic brake, the combination with a brake pipe and a brake cylinder, of means for supplying fluid at high pressure to the brake cylinder in an emergency application of the brakes, means, the operation of which is electrically initiated, for effecting the operation of said high pressure means, and means, the operation of which is initiated by a reduction in brake pipe pressure, for also effecting the operation of said high pressure means.

2. In an electro-pneumatic brake, the combination with a brake pipe, of a brake pipe vent valve device operative to effect a reduction in brake pipe pressure, an operating valve device for effecting the operation of said vent valve device, electrically controlled means for effecting the operation of said operating valve device, and a valve device operated upon a sudden reduction in brake-pressure for also effecting the operation of said vent valve device.

3. In an electro-pneumatic brake, the combination with a brake pipe, of electrically controlled means for effecting an emergency application of the brakes, a switch device for controlling the circuit of said electrically controlled means and controlled by said electrically controlled means, and means operated upon a sudden reduction in brake pipe pressure for also effecting the operation of said switch device.

4. In an electro-pneumatic brake, the combination with a brake pipe, of electrically controlled means operated upon deenergization for effecting an emergency application of the brakes, a switch device operated upon denergization of said electrically controlled means for opening the circuit of said electrically controlled means, and means operated upon a sudden reduction in brake pipe pressure for operating said switch device to open said circuit.

5. In an electro-pneumatic brake, the combination with a brake pipe, of electrically controlled means for effecting an emergency application of the brakes, a switch device for controlling the circuit of said electrically controlled means, a vent valve device for venting fluid under pressure from the brake pipe, means, the operation of which is controlled by said electrically controlled means, for effecting the operation of said switch device and said vent valve device, and means, the operation of which is initiated by a sudden reduction in brake pipe pressure for also effecting the operation of said switch device and said vent valve device.

6. In an electro-pneumatic brake, the combination with means for controlling the brakes electrically and means for controlling the brakes pneumatically, of means controlled by said electric control means independently of said pneumatic control means for rendering either the electric or the pneumatic control means effective to control the brakes.

7. In an electro-pneumatic brake, the combination with means for controlling the brakes electrically and means for controlling the brakes pneumatically, of means having one position in which the electric brake controlling means is rendered effective to control the brakes and another position in which the pneumatic brake controlling means is rendered effective to control the brakes, the movement of said means to its different positions being controlled by said electric brake controlling means independently of said pneumatic brake controlling means.

8. In an electro-pneumatic brake, the combination with a brake pipe, of a valve device operated upon a reduction in brake pipe pressure for effecting an application of the brakes, electrically controlled means for also effecting an application of the brakes, a change-over valve device having one position in which the release of the brakes is effected through said electrically controlled means and another position in which the release of the brakes is effected through said brake pipe pressure controlled valve device, the operation of said change-over valve device being controlled by said electrically controlled means independently of said brake pipe pressure controlled valve device.

9. In an electro-pneumatic brake, the combination with means for effecting an emergency application of the brakes at high pressure, of electrically controlled means for effecting the operation of said high pressure means, pneumatically controlled means for also effecting the operation of said high pressure means, and means for delaying the operation of said high pressure means when the operation of said high pressure means is effected by said pneumatically controlled means.

10. In an electro-pneumatic brake, the combination with a brake pipe and a brake cylinder, of valve means for controlling the supply of fluid at high pressure to the brake cylinder in an emergency application of the brakes, electrically controlled means for effecting the operation of said valve means, a valve device operated upon a sudden reduction in brake pipe pressure for also effecting the operation of said valve means, and means operative to delay the operation of said valve means when said valve means is operated through the operation of said valve device.

11. In an electro-pneumatic brake, the combination with means for controlling the brakes pneumatically, of means for controlling the brakes electrically having means to effect a service application of the brakes and means to effect an emergency application of the brakes, and a valve device having one position in which the electric brake controlling means is rendered effective and another position in which the pneumatic brake controlling means is rendered effective, said valve device being held in its pneumatic operating position by the operation of the electric emergency controlling means.

12. In an electro-pneumatic brake, the combination with pneumatic means for controlling the brakes, a magnet, valve means operated by said magnet for effecting a service application of the brakes, and separate valve means operated by said magnet, of a change-over valve device having one position for controlling the brakes pneumatically and another position for controlling the brakes electrically, said change-over valve device being controlled by said separate valve means.

13. In an electro-pneumatic brake, the combination with pneumatic means for controlling the brakes, a magnet, valve means operated by said magnet for effecting a service application of the brakes, and separate valve means operated by said magnet, of a change-over valve device having one position for controlling the brakes pneumatically and another position for controlling the brakes electrically, said separate valve means being operated upon deenergization of said magnet for effecting the movement of said change-over valve device to its pneumatic position.

14. In an electro-pneumatic brake, the combination with pneumatic means for controlling the brakes and electrically controlled means for controlling the brakes, of a change-over valve device having a position in which the brakes are controlled pneumatically and a position in which the brakes are controlled electrically and movable by a reduction in fluid pressure to the pneumatic position, and means controlled by said electrically controlled means for venting fluid under pressure from said change-over valve device.

15. In an electro-pneumatic brake, the combination with pneumatic means for controlling the brakes and electrically controlled means for controlling the brakes, of a change-over valve device having a position in which the brakes are controlled pneumatically and a position in which the brakes are controlled electrically and movable by a reduction in fluid pressure to the pneumatic position, and means operated upon deenergization of said electrically controlled means for venting fluid under pressure from said change-over valve device.

16. In an electro-pneumatic brake, the combination with pneumatic means for controlling the brakes, electrically controlled means for effecting a service application of the brakes, and electrically controlled means for effecting an emergency application of the brakes, of a change-over valve device having a position for controlling the brakes pneumatically and a position for controlling the brakes electrically and movable by a reduction in fluid pressure to the pneumatic position, and means controlled by said emergency electrically controlled means for venting fluid from said change-over valve device.

In testimony whereof I have hereunto set my hand.

THOMAS H. THOMAS.